US012320195B2

(12) United States Patent
Wang

(10) Patent No.: US 12,320,195 B2
(45) Date of Patent: Jun. 3, 2025

(54) POWER AUXILIARY DEVICE FOR SMALL-SIZED ROLLER SHADE

(71) Applicant: Chih-Yung Wang, Taipei (TW)

(72) Inventor: Chih-Yung Wang, Taipei (TW)

( * ) Notice: Subject to any disclaimer, the term of this patent is extended or adjusted under 35 U.S.C. 154(b) by 341 days.

(21) Appl. No.: 17/902,368

(22) Filed: Sep. 2, 2022

(65) Prior Publication Data

US 2024/0076935 A1 Mar. 7, 2024

(51) Int. Cl.
*E06B 9/42* (2006.01)
*E06B 9/72* (2006.01)

(52) U.S. Cl.
CPC . *E06B 9/72* (2013.01); *E06B 9/42* (2013.01)

(58) Field of Classification Search
CPC ... E06B 9/60; E06B 9/42; E06B 9/322; E06B 9/72; E06B 9/68; E06B 2009/3222
See application file for complete search history.

(56) References Cited

U.S. PATENT DOCUMENTS 8,291,959 B2 * 10/2012 Cheng .................... E06B 9/262 160/84.01
10,113,359 B1 * 10/2018 Chen .................... E06B 9/42
11,326,397 B2 * 5/2022 Lei .................... E06B 9/42
11,697,964 B2 * 7/2023 Lei .................... E06B 9/42 160/315
2013/0087415 A1 * 4/2013 Hsieh .................... E06B 9/322 185/37
2018/0313143 A1 * 11/2018 Chang .................... E06B 9/322
2024/0026735 A1 * 1/2024 Liang .................... E06B 9/60

FOREIGN PATENT DOCUMENTS

GB 2622075 A * 3/2024 ............... E06B 9/42

* cited by examiner

*Primary Examiner* — Abe Massad
(74) *Attorney, Agent, or Firm* — MUNCY, GEISSLER, OLDS & LOWE, P.C.

(57) ABSTRACT

The invention provides a power auxiliary device for a small-sized roller shade, including a fixed assembly and a transmission assembly. The fixed assembly includes a fixed seat and an upper cover. The transmission assembly includes a power portion with a gear, a speed-changing portion including a big speed-changing gear engaged with the gear and a small speed-changing gear, a transmission portion having a first transmission gear engaged with the small speed-changing gear and a second transmission gear disengaged with the first transmission gear and a reed piece, two ends of which are connected with the transmission portion separately. A length of the reed piece is shortened, and a crinkling volume of the reed piece is reduced through the speed-changing portion, so that the reed piece is applied to a smaller pipe diameter of a small-sized roller shade.

7 Claims, 11 Drawing Sheets

POWER AUXILIARY DEVICE FOR SMALL-SIZED ROLLER SHADE

FIELD OF THE INVENTION

The invention relates to a power auxiliary device, in particular to a power auxiliary device for a small-sized roller shade.

BACKGROUND OF THE INVENTION

It has become extremely popular that urban houses and offices use curtains for sun shading or decoration. However, for modes of pull-opening and folding the curtains, a roller shade 1 is commonly used. Referring to FIGS. 1, 2, and 3, the roller shade 1 comprises a rail 11, a pipe body 12, and two fixed brackets 13 respectively mounted on two sides of the rail 11. A pull-opening and roll-up device 14 is disposed at the left end of the pipe body 12 and comprises a coil spring 141 and a fixing device 142. When the pull-opening and roll-up device 14 is pulled by one time, a curtain fabric 16 is opened downward; when the pull-opening and roll-up device 14 is pulled by one time again, and the curtain fabric 16 is folded upward, the curtain fabric 16 is slowly folded through a buffer device 15 disposed at the right end of the pipe body 12. The roller shade 1 generally has a large diameter, the coil spring 141 mounted therein is large in diameter. Winding force of the coil spring is strong enough to roll up the curtain fabric 16 of the roller shade 1.

However, if the roller shade 1 needs to be reduced in diameter and applied to a small space such as an automobile curtain, a tiny coil spring requires to be used. The coil spring would have a problem of insufficient winding force, thus the conventional roller shade needs an improvement.

SUMMARY OF THE INVENTION

A major objective of the invention is to solve the existing problem with insufficient roll-up and winding force of a tiny coil spring provided in a roller shade.

To achieve the objective, the invention provides a power auxiliary device for a small-sized roller shade. The power auxiliary device comprises a fixed assembly, comprising a fixed seat and an upper cover overlying the fixed seat, wherein the fixed seat comprises a holding portion defined by the fixed seat, a connecting convex rod extending from an end of the holding portion, and a connecting concave portion disposed at an other end of the holding portion, and the connecting concave portion communicates with the holding portion, and a transmission assembly, disposed in the holding portion of the fixed assembly and comprising a power portion, a speed-changing portion, a transmission portion and a reed piece, wherein the power portion comprises a rotating shaft disposed on the connecting concave portion, and the rotating shaft comprises a gear disposed at the end of the holding portion, and wherein the speed-changing portion is pivotably coupled to the end of the holding portion and abuts the gear, and the speed-changing portion comprises a big speed-changing gear engaged with the gear of the rotating shaft and a small speed-changing gear connected to an upper side of the big speed-changing gear, and wherein the transmission portion is pivotably coupled into the holding portion and abuts the speed-changing portion, and the transmission portion comprises a first transmission gear engaged with the small speed-changing gear and a second transmission gear disengaged with the first transmission gear; two ends of the reed piece are connected with the first transmission gear and the second transmission gear respectively; an external shape of the reed piece is disposed into an S shape; and a length of the reed piece is shortened and a crinkling volume of the reed piece is reduced through the speed-changing portion.

Further, the holding portion comprises a convex rim connected with one side of the connecting convex rod and two walls connected between the convex rim and the connecting concave portion, and a groove is formed in an upper side of the convex rim, and wherein the holding portion, from the convex rim to the connecting concave portion, comprises a first space, a second space separate from the first space, and a third space communicating with the second space, and the first space is provided with a first frame circle protruding from an inner bottom of the holding portion, connecting with inner sides of the two walls and connecting one side of the convex rim opposite to the connecting convex rod, and the second space is provided with a second frame circle protruding from the inner bottom of the holding portion, connecting with the inner sides of the two walls and connecting the first frame circle, and the third space is provided with a third frame circle protruding from the inner bottom of the holding portion, connecting with the inner sides of the two walls and connecting the second frame circle, and wherein a reinforcing convex body extends from each of the inner sides of the two walls between the first frame circle and the second frame circle, and the second frame circle communicates with the third frame circle, and wherein two shaft rods respectively extend upward from the first space and the second space and are extended from the inner bottom of the holding portion, and wherein a convex connection portion providing a screw hole is disposed on an upper side of each of the two shaft rods, and a first abutting block extends from a lower side of each of the two shaft rods, an outside diameter of the first abutting block is larger than an outside diameter of each of the two shaft rods, and wherein an inside diameter of the first space is equal to an inside diameter of the second space, and the inside diameters of the first space and the second space are larger than an inside diameter of the third space, and wherein a second abutting block extends upward from the third space and extends from the inner bottom of the holding portion, and a through hole is formed in the second abutting block, and wherein the connecting convex rod is in a hexagonal shape, and a hexagonal concave hole is formed in the connecting convex rod, and a fixed hole penetrating through the hexagonal concave hole is formed in an upper side and a lower side of the connecting convex rod, and a first fixing piece penetrates through the fixed hole, and wherein the connecting concave portion is provided with a first concave circle and a second concave circle abutting one side of the first concave circle facing the holding portion, and an inside diameter of the second concave circle is larger than an inside diameter of the first concave circle, and a screwing hole and a pin hole formed beside the screwing hole are formed in the upper side of the connecting concave portion and are formed on two sides of the first concave circle.

Further, the upper cover comprises a first pressing plate, two second pressing plates connected to two sides of the first pressing plate and extended outward, and a third pressing plate connected to a third side of the first pressing plate, and the first pressing plate comprises a convex body, two convex pressing bodies and a pressing rod, wherein the convex body is disposed at an other end of the first pressing plate and clamped into the groove of the convex rim, and the two convex pressing bodies are arranged symmetrically relative to a symmetry axis along the two second pressing plates, and the two convex pressing bodies are formed on and extended from a bottom surface of the first pressing plate, and a sunken surface is arranged at bottom of each of the two convex pressing bodies and assembles with the convex connection portion, and two counterbores are formed in an upper surface of the first pressing plate corresponding to the two convex pressing bodies, and two fixing pieces penetrate and fasten the two counterbores and the screw hole of the convex connection portion, and the pressing rod is disposed on the bottom surface and the third side of the first pressing plate opposite to the convex body, and the pressing rod comprises a cross cylinder and a convex column extending downward from bottom of the cross cylinder, and the convex column is pivoted to the speed-changing portion, and the cross cylinder abuts an upper side of the small speed-changing gear, and the two second pressing plates respectively from two sides of the first pressing plate are bent downward into arch shapes and are between the two convex pressing bodies, the two second pressing plates overlie the two walls, and each of the two second pressing plates comprises an abutting convex and a clamping groove, the abutting convex is arranged on each bottom of the two second pressing plates and protrudes inward, the clamping groove is dug in the abutting convex, and the abutting convex abuts each inner side of the two walls, and the two reinforcing convex bodies are placed and fixed into the clamping groove, and the third pressing plate overlies the connecting concave portion and comprises a convex plate, a third concave circle and a fourth concave circle, and the convex plate connects to one end of the cross cylinder, the third concave circle is beside to one side of the convex plate opposite to the cross cylinder, the fourth concave circle is beside the third concave circle, and the third concave circle assembles with the second concave circle of the connecting concave portion and form a first circular space, and the fourth concave circle assembles with the first concave circle of the connecting concave portion and form a second circular space, and the third pressing plate is provided with two holes and two convex pins, the two holes corresponds to the screwing hole of the connecting concave portion, and each of the two convex pins is embedded to the pin hole of the connecting concave portion, and two second fixing pieces penetrate through the two holes and fasten the screwing hole.

Further, the speed-changing portion is pivotably coupled to the third space of the holding portion and further comprises an embedding rod and an embedding groove, and the embedding rod is connected with the lower side of the big speed-changing gear and is embedded into the through hole of the second abutting block, and the embedding groove is formed between the embedding rod and the big speed-changing gear, and the embedding groove is provided to embed the second abutting block.

Further, the transmission portion is pivotably coupled to the second space and the third space of the holding portion, and a first sleeve and a second sleeve are respectively disposed on the first transmission gear and the second transmission gear, and the first sleeve and the second sleeve are pivoted to the two shaft rods, and a first bottom rod and a second bottom rod are respectively disposed under the first transmission gear and the second transmission gear, and the first bottom rod and the second bottom rod abut the first abutting block, and a first clamping groove is formed in the first sleeve, and a second clamping groove is formed in the second sleeve, wherein the two ends of the reed piece are respectively connected with the first clamping groove of the first sleeve and the second clamping groove of the second transmission gear and sleeved on outer surfaces of the first sleeve and the second sleeve.

Further, the power portion further comprises a rotating body, and the rotating body comprises a shaft hole and at least one limiting groove, and the shaft hole is a hexagonal hole, wherein the rotating shaft further comprises a round rod connected with one end of the gear and disposed in the second circular space, a convex blocking sheet connected with the round rod and protruding in an opposite direction of the gear, a convex shaft connected with the convex blocking sheet and protruding in an opposite direction of the round rod, and a clamping shaft connected with the convex shaft and protruding in an opposite direction of the convex blocking sheet, wherein the convex blocking sheet abuts the connecting concave portion, and the convex blocking sheet is provided between the third pressing plate and the rotating body, and the convex shaft is disposed into the hexagonal shape corresponding to shape of the shaft hole of the rotating body, and the convex shaft is positioned in the shaft hole of the rotating body, the rotating body rotates and drives the rotating shaft, and the clamping shaft is provided with a convex flange blocks positioning from outside of the shaft hole.

Further, outside diameters and numbers of teeth of the gear and the big speed-changing gear are equal, and outside diameter of the big speed-changing gear is two times longer than outside diameter of the small speed-changing gear, and numbers of teeth of the small speed-changing gear and the big speed-changing gear are equal, and outside diameters and numbers of teeth of the first transmission gear and the second transmission gear are equal, and outside diameters and numbers of teeth of the first transmission gear and the second transmission gear are two times larger than outside diameters and numbers of teeth of the small speed-changing gear.

Further, numbers of teeth of the gear, the big speed-changing gear, and the small speed-changing gear are 10, and numbers of teeth of the first transmission gear and the second transmission gear are 20.

Compared with conventional technique, the invention has following characteristics:

1. For the power auxiliary device of the invention, a length of the reed piece is shortened and a crinkling volume of the reed piece is reduced through the speed-changing portion, so that the reed piece is applied to a smaller pipe diameter of the small-sized roller shade; and the small-sized roller shade is matched with a small-sized coil spring through the power auxiliary device to achieve a winding function.

2. The power auxiliary device is designed according to the actual demand and matches with a small-sized roller shade being in a small-sized winding mode or small-sized rainbow blinds.

DETAILED DESCRIPTION OF THE PREFERRED EMBODIMENTS

Figure 1:
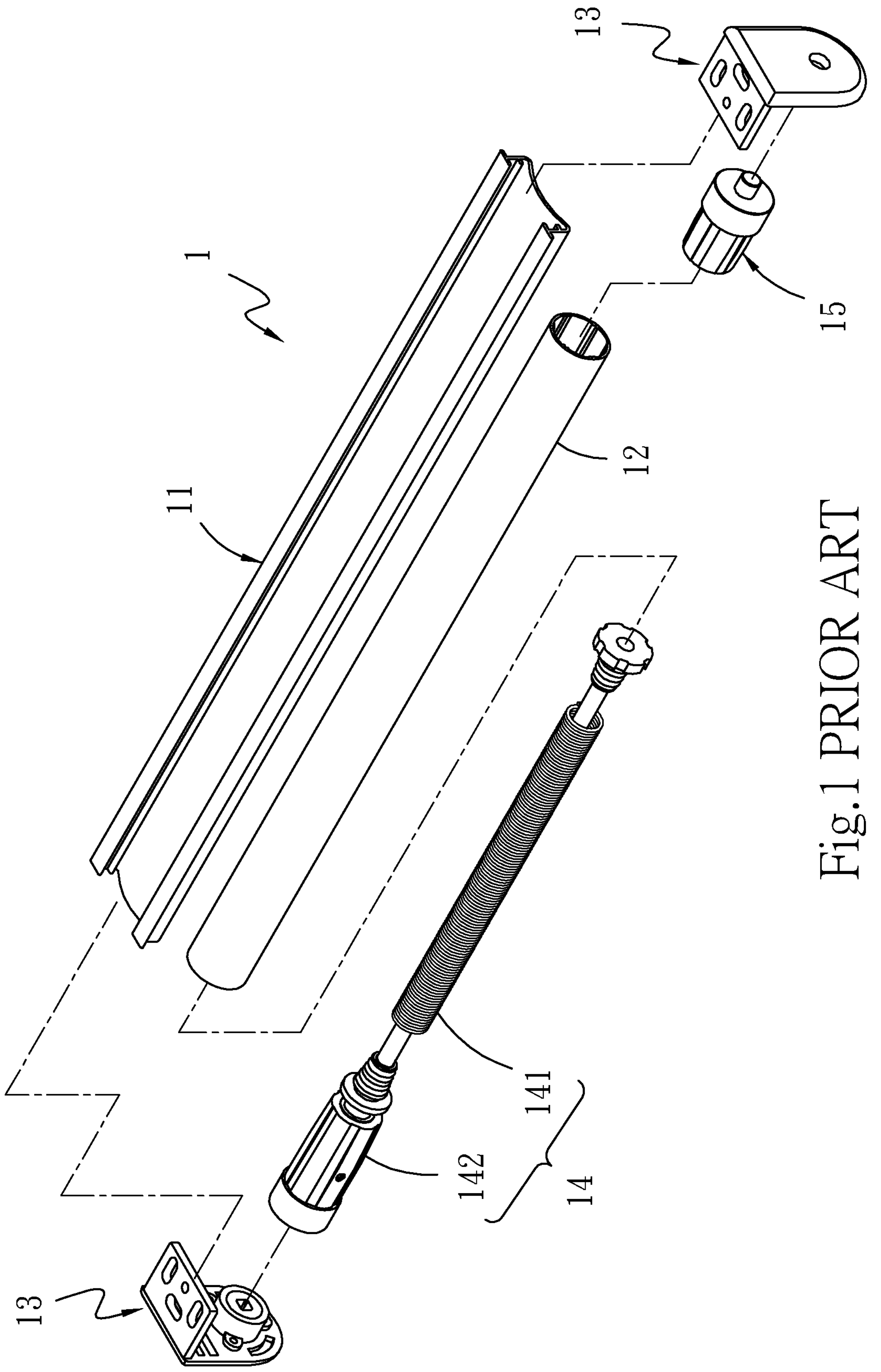
Fig.1 PRIOR ART
FIG. 1 is an exploded perspective view of a conventional large roller shade.
Figure 2:
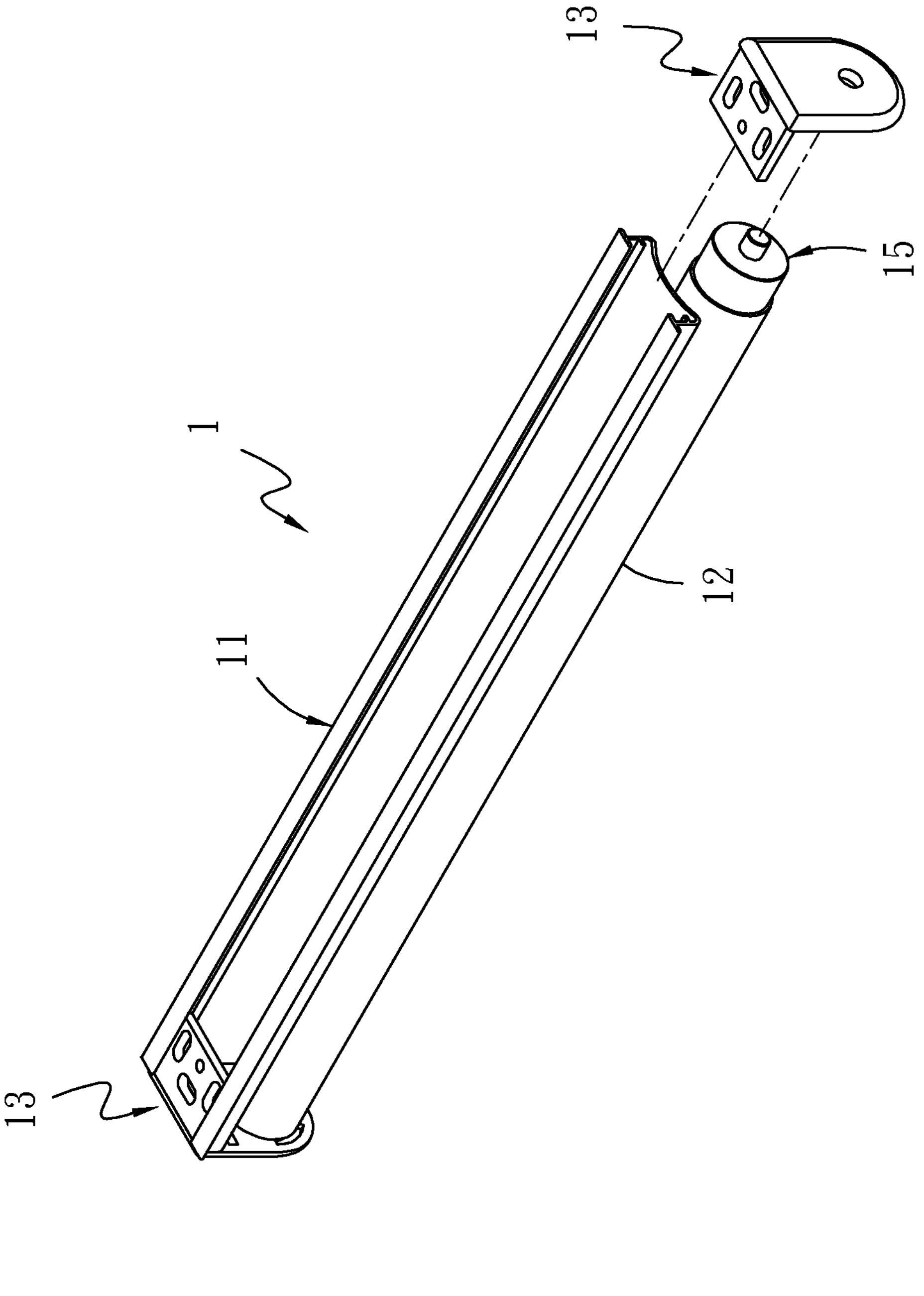
Fig.2 PRIOR ART
FIG. 2 is a schematic diagram of the conventional large roller shade in FIG. 1 before assembly.
Figure 3:
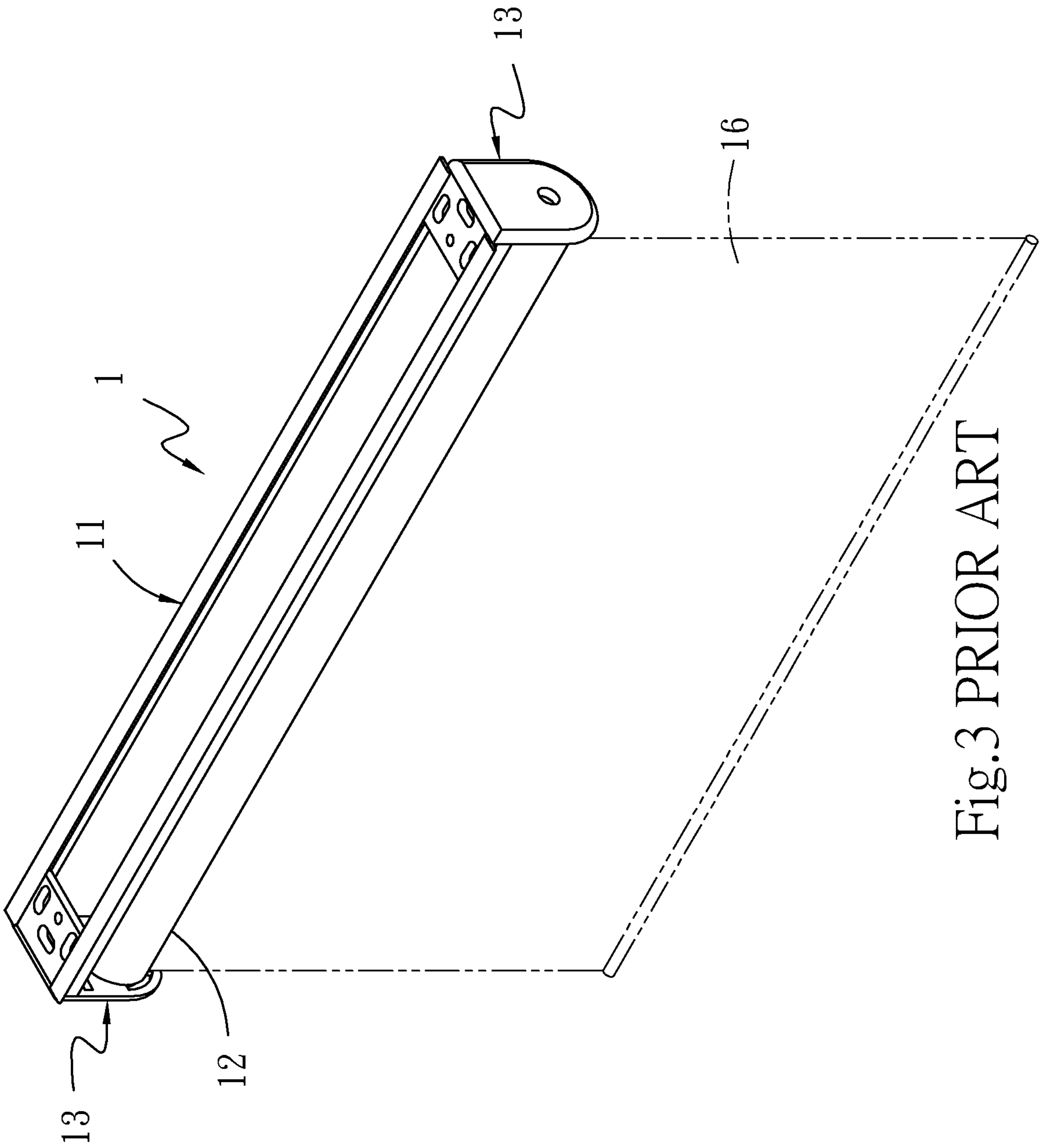
Fig.3 PRIOR ART
FIG. 3 is a perspective view of the conventional large roller shade in FIG. 1 after assembly.
Figure 4:
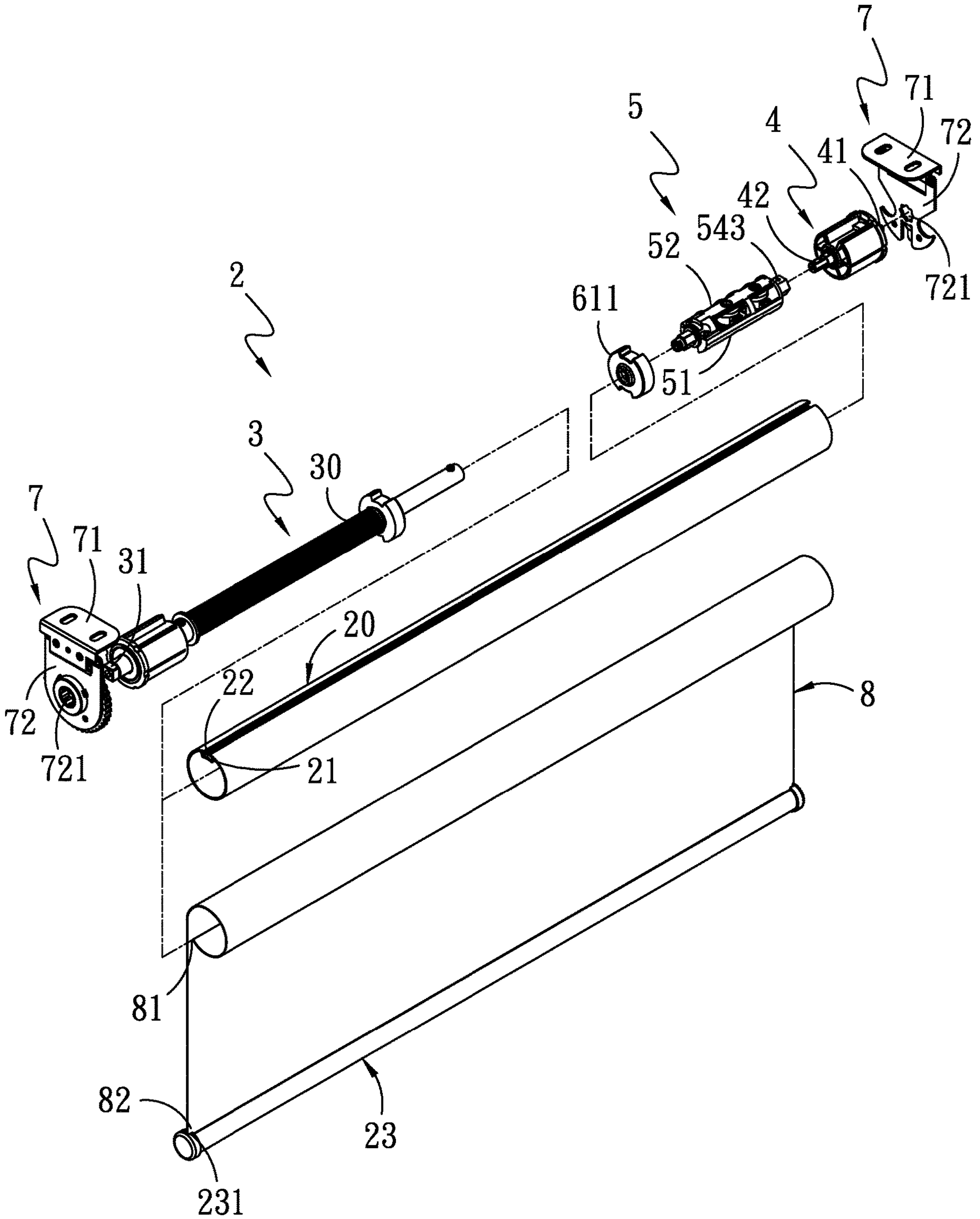
FIG. 4 is an exploded perspective view of a small-sized roller shade of the invention.
Figure 5:
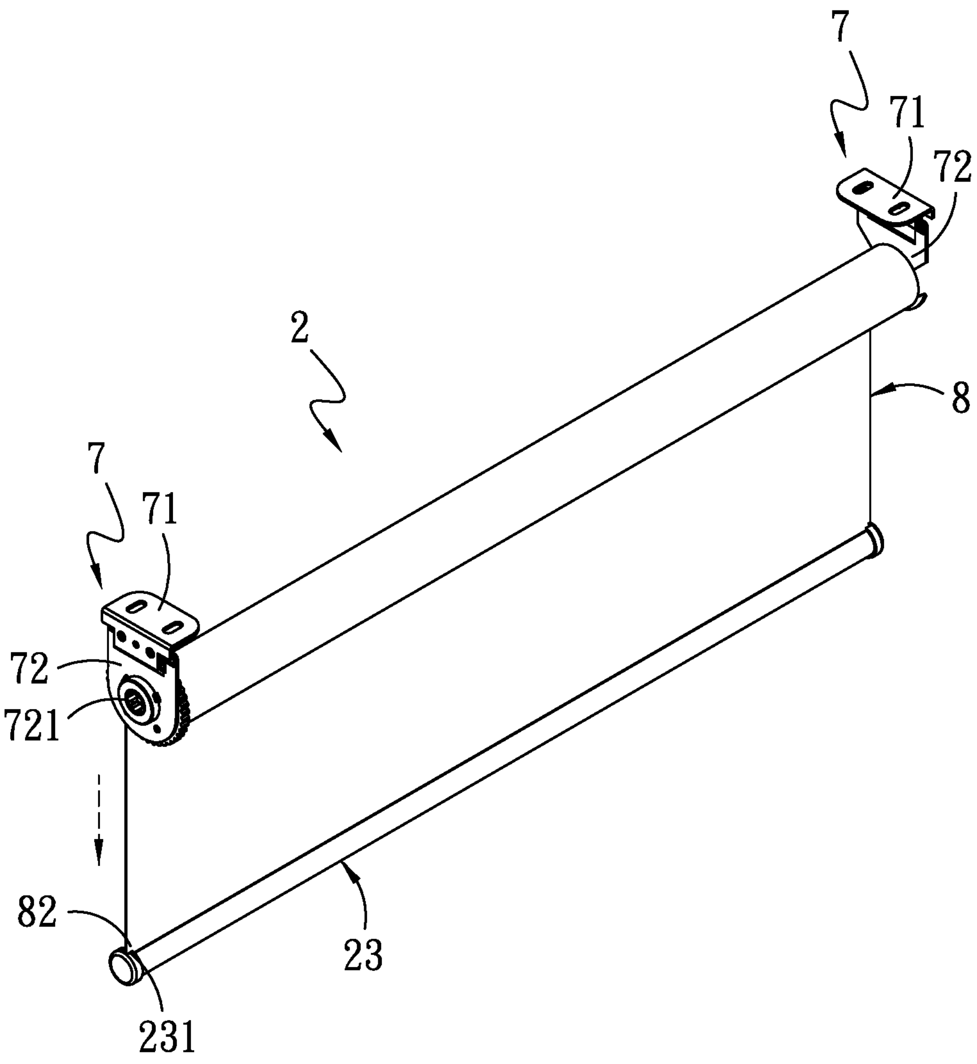
FIG. 5 is a perspective view of falling a curtain sheet of the small-sized roller shade in FIG. 4.
Figure 6:
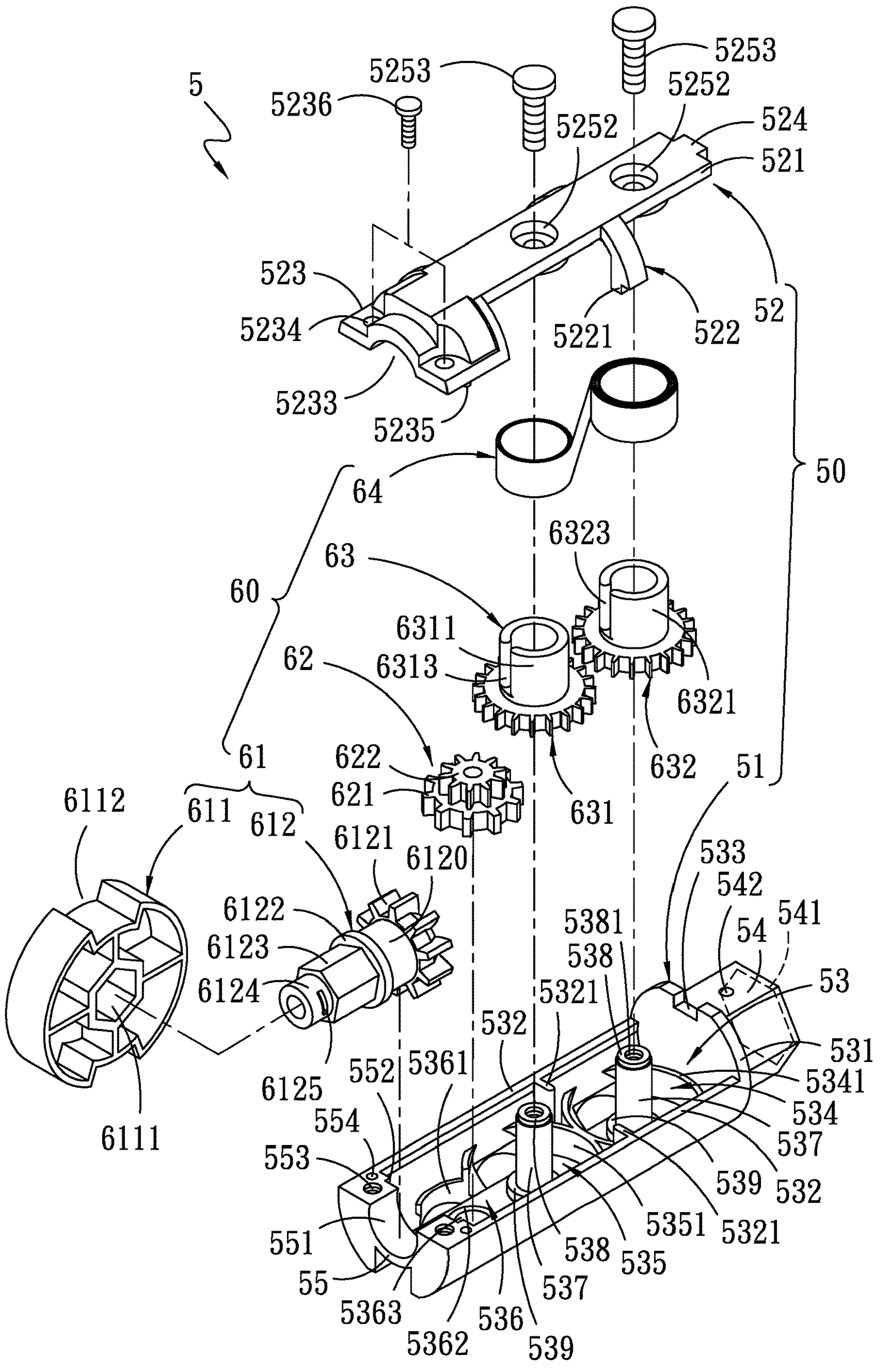
FIG. 6 is an exploded perspective view of a power auxiliary device of the invention.
Figure 7:
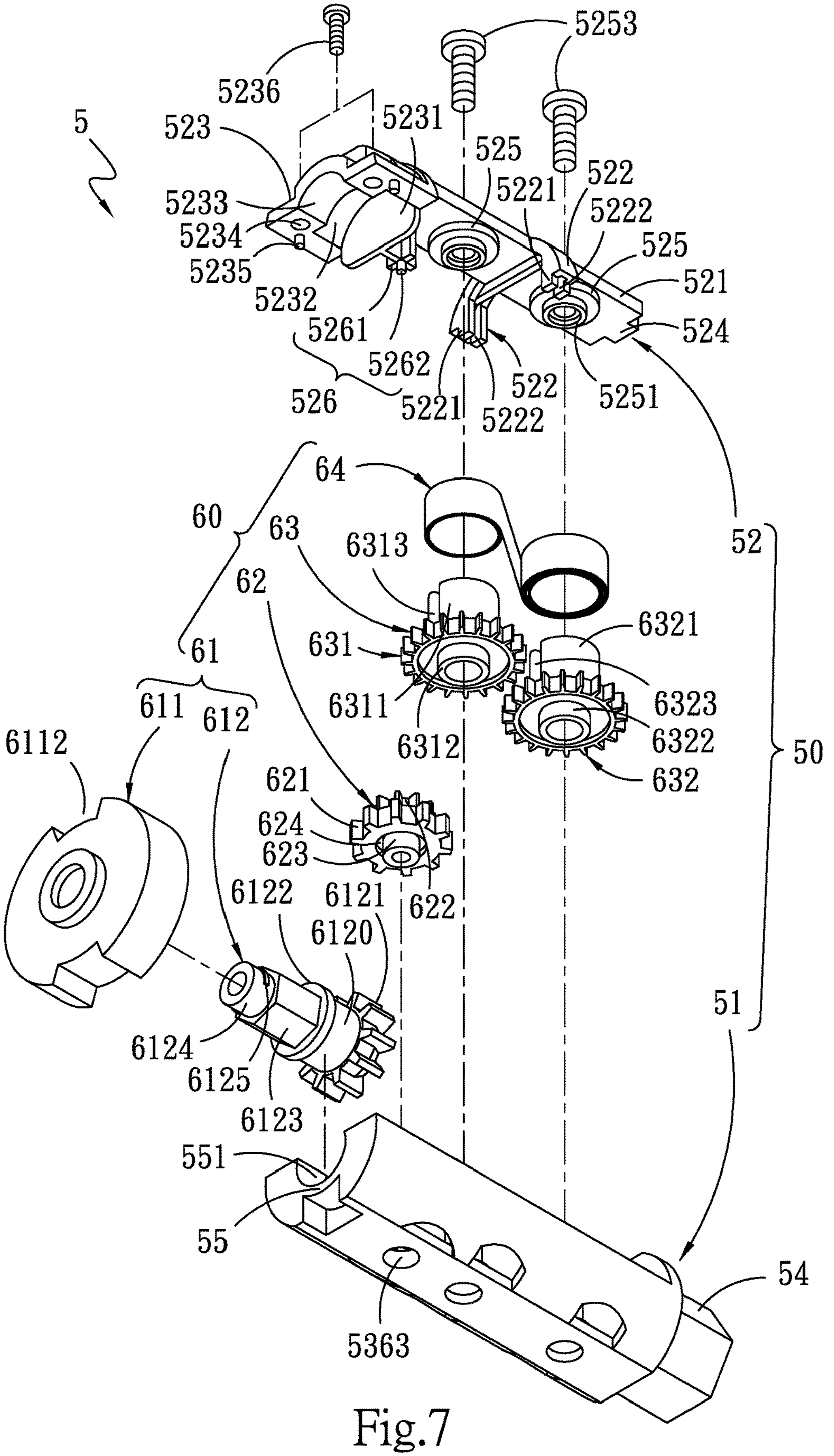
FIG. 7 is an exploded perspective view of the power auxiliary device in FIG. 6 from another aspect.
Figure 8:
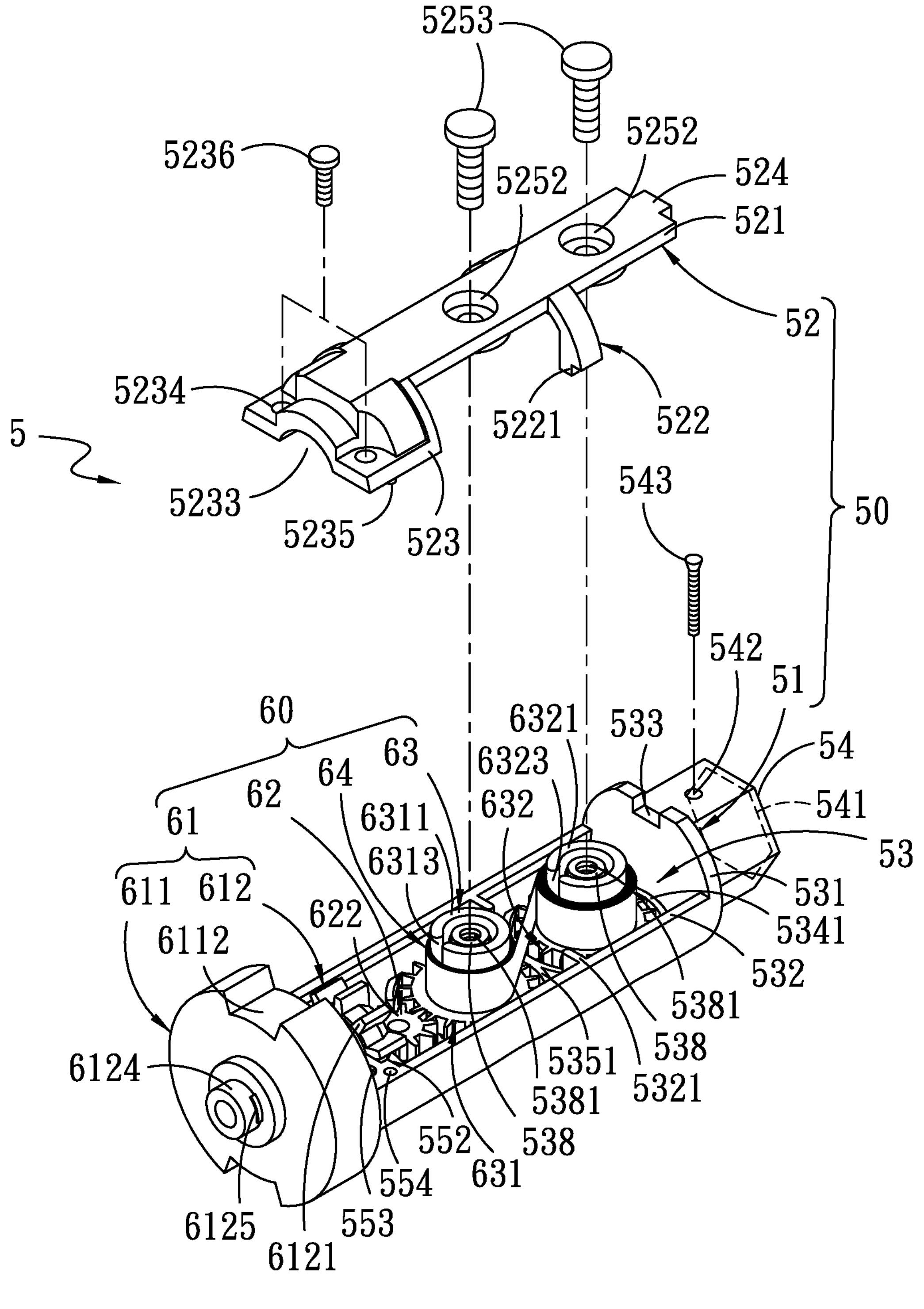
FIG. 8 is an exploded perspective view of the power auxiliary device in FIG. 6 and an upper cover.

Detailed description and technical content of the invention are described in cooperation with the drawings as follows:

Referring to FIG. 4 and FIG. 5, the invention provides a power auxiliary device for a small-sized roller shade. The power auxiliary device 5 matches with a small-sized roller shade 2 and a small-sized zebra blind. In this embodiment, the small-sized roller shade 2 comprises an upper rail 20, a winding device 3 mounted at an end in the upper rail 20, a fixing device 4 mounted in the other end of the upper rail 20 opposite to the winding device 3, the power auxiliary device 5 mounted in the upper rail 20 and is connected with one end of the fixing device 4, two fixed brackets 7 respectively connected with the winding device 3 and the fixing device 4 through shafts and are disposed and fixed on two upper sides of a window, a lower rail 23 disposed below the upper rail 20, and a curtain sheet 8. The upper rail 20 is provided with a limiting convex body 21. The winding device 3 and the fixing device 4 are assembled and fixed on the limiting convex body 21. An embedding groove 22 is formed in upper side of the limiting convex body 21. A starting end 81 of the curtain sheet 8 is embedded into and connected with the embedding groove 22, and the outer surface of the upper rail 20 is adapted to wind the curtain sheet, so that the curtain sheet 8 is driven by the upper rail 20 to roll-up. A channel 231 is formed in the surface of the lower rail 23; and a terminal 82 of the curtain sheet 8 is placed and fixed into the channel 231.

A square fixed column 31 is arranged at one end of the winding device 3, and a left end of the square fixed column 31 is connected to the two fixed brackets 7 through the shaft. A coil spring 30 is arranged at an other end of the winding device 3. The more the coil spring 30 is wound, the tighter it is when the curtain sheet 8 is driven by rotation of the upper rail 20 to be pulled and opened downward. The winding device 3 is a conventional member and will not be described here.

A square first convex shaft 41 is arranged at an end of the fixing device 4. A right end of the square first convex shaft 41 is connected with one of the two fixed brackets 7 through the shaft and extends out of one of the two fixed brackets 7. A hexagonal second convex shaft 42 is arranged at an other end of the fixing device 4. The fixing device 4 is a conventional member and will not be described any more here.

Referring to FIGS. 4, 6, 7, 8, 9, 10, and 11 again, the power auxiliary device 5 comprises a fixed assembly 50 and a transmission assembly 60 which is disposed in the fixed assembly 50 and forms transmission, wherein the fixed assembly 50 comprises a fixed seat 51 and an upper cover 52 overlies the fixed seat 51; and the upper cover 52 is assembled and connected with the fixed seat 51 through screwed connection, nesting, clamping or the like. The fixed seat 51 comprises a holding portion 53 defined by the fixed seat 51, a connecting convex rod 54 extending from an end of the holding portion 53, and a connecting concave portion 55 disposed at an other end of the holding portion 53. In this embodiment, the holding portion 53 comprises a convex rim 531 connected with one side of the connecting convex rod 54 and two walls 532 connected between the convex rim 531 and the connecting concave portion 55, and a groove 533 is formed in an upper side of the convex rim 531. The holding portion 53, from the convex rim 531 to the connecting concave portion 55, comprises a first space 534, a second space 535 which does not communicate with the first space 534 and a third space 536 communicating with the second space 535. The first space 534 is provided with a first frame circle 5341 protruding from an inner bottom of the holding portion 53, connecting with inner sides of the two walls 532 and connecting one side of the convex rim 531 opposite to the connecting convex rod 54. The second space 535 is provided with a second frame circle 5351 protruding from the inner bottom of the holding portion 53, connecting with the inner sides of the two walls 532 and connecting the first frame circle 5341. The third space 536 is provided with a third frame circle 5361 protruding from the inner bottom of the holding portion 53, connecting with the inner sides of the two walls 532 and connecting the second frame circle 5351, and wherein a reinforcing convex body 5321 extends from each of the inner side of the two walls 532 between the first frame circle 5341 and the second frame circle 5351. The second frame circle 5351 communicates with the third frame circle 5361, and wherein two shaft rods 537 respectively extend upward from the first space 534 and the second space 535 and are extended from the inner bottom of the holding portion 53, and wherein a convex connection portion 538 providing a screw hole 5381 is disposed on an upper side of each of the two shaft rods 537, and a first abutting block 539 extends from a lower side of each of the two shaft rods 537, an outside diameter of the first abutting block 539 is larger than an outside diameter of each of the two shaft rods 537. An inside diameter of the first space 534 is equal to an inside diameter of the second space 535, and the inside diameters of the first space 534 and the second space 535 are larger than an inside diameter of the third space 536. A second abutting block 5362 extends upward from the third space 536 and extends from the inner bottom of the holding portion 53, and a through hole 5363 is formed in the second abutting block 5362. The connecting convex rod 54 is in a hexagonal shape, and a hexagonal concave hole 541 is formed in the connecting convex rod 54 and is assembled and fixed to the second convex shaft 42 of the fixing device 4. A fixed hole 542 penetrating through the hexagonal concave hole 541 is formed in an upper side and a lower side of the connecting convex rod 54. A first fixing piece 543 penetrates through the fixed hole 542 to be fixed with the second convex shaft 42. The connecting concave portion 55 communicates with the holding portion 53 and is provided with a first concave circle 551 and a second concave circle 552 facing the holding portion 53 and abuts one side of the first concave circle 551. An inside diameter of the second concave circle 552 is larger than an inside diameter of the first concave circle 551, and a screwing hole 553 and a pin hole 554 formed beside the screwing hole 553 are formed in the upper side of the connecting concave portion 55 and are formed on two sides of the first concave circle 551.

Further referring to FIG. 4, and FIGS. 6, 7, 8, 9, and 10, the upper cover 52 comprises a first pressing plate 521, two second pressing plates 522 connected to two sides of the first pressing plate 521 and extended outward, and a third pressing plate 523 located on an end of the first pressing plate 521. The first pressing plate 521 comprises a convex body 524, two convex pressing bodies 525 and a pressing rod 526, wherein the convex body 524 is disposed at an other end of the first pressing plate 521 and clamped into the groove 533 of the convex rim 531, and the two convex pressing bodies 525 are arranged symmetrically relative to a symmetry axis along the two second pressing plates 522, and the two convex pressing bodies 525 are formed on and extended from a bottom surface of the first pressing plate 521, and a sunken surface 5251 is arranged at bottom of each of the two convex pressing bodies 525 and assembles with the convex connection portion 538, and two counterbores 5252 are formed in an upper surface of the first pressing plate 521 corresponding to the two convex pressing bodies 525, and two fixing pieces 5253 penetrate and fasten the two counterbores 5252 and the screw hole 5381 of the convex connection portion 538, and the pressing rod 526 is disposed on the bottom surface and the end of the first pressing plate 521 opposite to the convex body 524, and the pressing rod 526 comprises a cross cylinder 5261 and a convex column 5262 extending downward from bottom of the cross cylinder 5261. The two second pressing plates 522 respectively from two sides of the first pressing plate 521 are bent downward into arch shapes and are between the two convex pressing bodies 525, the two second pressing plates 522 overlie the two walls 532, and each of the two second pressing plates 522 comprises an abutting convex 5221 and a clamping groove 5222, the abutting convex 5221 is arranged on a bottom of each of the two second pressing plates 522 and protrudes inward, the clamping groove 5222 is dug in the abutting convex 5221, and the abutting convex 5221 abuts each inner side of the two walls 532, and the two reinforcing convex bodies 5321 are placed and fixed into the clamping groove 5222. The third pressing plate 523 overlies the connecting concave portion 55 and comprises a convex plate 5231, a third concave circle 5232 and a fourth concave circle 5233. The convex plate 5231 connects to one end of the cross cylinder 5261, the third concave circle 5232 besides to one side of the convex plate 5231 opposite to the cross cylinder 5261, the fourth concave circle 5233 is beside the third concave circle 5232; the third concave circle 5232 assembles with the second concave circle 552 of the connecting concave portion 55 to form a first circular space 527, and the fourth concave circle 5233 assembles with the first concave circle 551 of the connecting concave portion 55 to form a second circular space 528. The third pressing plate 523 is assembled and connected with the connecting concave portion 55 in a manner of screwed connection, nesting, clamping or the like. In this embodiment, the third pressing plate 523 is provided with two holes 5234 and two convex pins 5235, the two holes 5234 corresponds to the screwing hole 553 of the connecting concave portion 55, and each of the two convex pins 5235 is positioned and embedded to the pin hole 554, and two second fixing pieces 5236 penetrate through the two holes 5234 and fasten the screwing hole 553.

Referring to FIG. 4, and FIGS. 6, 7, 8, 9, 10, and 11 again, the transmission assembly 60 comprises a power portion 61, a speed-changing portion 62, a transmission portion 63 and a reed piece 64, wherein the power portion 61 comprises a rotating body 611 embedded into the upper rail 20 and a rotating shaft 612 connected with the rotating body 611. The rotating body 611 is driven by the upper rail 20 to rotate with the rotating shaft 612 together and comprises a shaft hole 6111 and at least one limiting groove 6112. In this embodiment, the shaft hole 6111 is a hexagonal hole, and the limiting convex body 21 of the upper rail 20 is embedded into the at least one limiting groove 6112, so that the upper rail 20 drives the rotating body 611 to rotate with the limiting convex body 21 of the upper rail 20. The rotating shaft 612 is disposed in the connecting concave portion 55 and the third pressing plate 523, and the rotating shaft 612 comprises a gear 6121 disposed in the first circular space 527, a round rod 6120 connected with one end of the gear 6121 and disposed in the second circular space 528, a convex blocking sheet 6122 connected with the round rod 6120 and protruding in an opposite direction of the gear 6121, a convex shaft 6123 connected with the convex blocking sheet 6122 and protruding in an opposite direction of the round rod 6120, and a clamping shaft 6124 connected with the convex shaft 6123 and protruding in an opposite direction of the convex blocking sheet 6122, wherein the convex blocking sheet 6122 abuts the connecting concave portion 55, and the convex blocking sheet 6122 is provided between the third pressing plate 523 and the rotating body 611, and the convex shaft 6123 is disposed into the hexagonal shape corresponding to shape of the shaft hole 6111 of the rotating body 611. When the convex shaft 6123 is embedded into the shaft hole 6111, a convex flange 6125 is disposed on the outer surface of the clamping shaft 6124 and abuts the exterior of the shaft hole 6111, so that the rotating shaft 612 is driven when the rotating body 611 rotates.

Referring to FIG. 4, and FIGS. 6, 7, 8, 9, 10, and 11 again, the speed-changing portion 62 is pivotably coupled to the third space 536 of the holding portion 53. The speed-changing portion 62 comprises a big speed-changing gear 621 engaged with the gear 6121 of the rotating shaft 612, a small speed-changing gear 622 connected with an upper side of the big speed-changing gear 621, an embedding rod 623 connected with the lower side of the big speed-changing gear 621, and an embedding groove 624 formed between the embedding rod 623 and the big speed-changing gear 621. The embedding groove 624 is embedded into the second abutting block 5362. In one embodiment, outside diameters and numbers of teeth of the big speed-changing gear 621 and the gear 6121 are equal. Outside diameter of the big speed-changing gear 621 is two times longer than outside diameter of the small speed-changing gear 622. The numbers of teeth of the small speed-changing gear 622 and the big speed-changing gear 621 are equal. When the speed-changing portion 62 is pivotably coupled to the third space 536 of the holding portion 53, the embedding rod 623 is embedded into the through hole 5363 of the second abutting block 5362, so that the second abutting block 5362 is embedded into the embedding groove 624. The convex column 5262 on bottom of the cross cylinder 5261 is pivoted to the speed-changing portion 62. The cross cylinder 5261 abuts the upper side of the small speed-changing gear 622, so that when the gear 6121 of the rotating shaft 612 rotates, rotating directions of the big speed-changing gear 621 and the small speed-changing gear 622 are changed into a reverse direction of rotation of the gear 6121. The speed-changing portion 62 is provided to shorten a length of the reed piece 64 and reduce a crinkling volume of the reed piece 64 to apply the reed piece 64 to a smaller pipe diameter of the small-sized roller shade 2, so that the small-sized roller shade 2 achieves winding function when matched with a coil spring 30 in small size through the power auxiliary device 5.

Referring to FIGS. 6, 7, 8, 9, 10, and 11 again, the transmission portion 63 is pivotably coupled to the second space 535 and the first space 534 of the holding portion 53. The transmission portion 63 comprises a first transmission gear 631 pivotably coupled to the interior of the second space 535 and engaged with the small speed-changing gear 622 and a second transmission gear 632 pivotably coupled to the interior of the first space 534 and disengaged with the first transmission gear 631. In this embodiment, outside diameters and numbers of teeth of the first transmission gear 631 and the second transmission gear 632 are equal; the outside diameters and numbers of teeth of the first transmission gear 631 and the second transmission gear 632 are two times those of the small speed-changing gear 622. When the small speed-changing gear 622 rotates, a rotation direction of the first transmission gear 631 is changed into a reverse direction of rotation of the small speed-changing gear 622. A first sleeve 6311 and a second sleeve 6321 pivoted to the two shaft rods 537 are disposed on the first transmission gear 631 and the second transmission gear 632. A first bottom rod 6312 and a second bottom rod 6322 abutting the two first abutting blocks 539 are disposed under the first transmission gear 631 and the second transmission gear 632. A first clamping groove 6313 is formed in the first sleeve 6311, and a second clamping groove 6323 is formed in the second sleeve 6321. Outside diameters of the first sleeve 6311 and the second sleeve 6321 are smaller than outside diameters of the first transmission gear 631 and the second transmission gear 632.

Referring to FIGS. 6, 7, 8, 9, 10, and 11 again, an external shape joint of the reed piece 64 is disposed into an S shape. Two ends of the reed piece 64 are respectively connected with the first clamping groove 6313 of the first sleeve 6311 and the second clamping groove 6323 of the second transmission gear 632. Outer surfaces of the first sleeve 6311 and the second sleeve 6321 are respectively adapted to wind two ends of the reed piece 64. When the first transmission gear 631 rotates, the second transmission gear 632 is in a rotation direction. The second transmission gear 632 is in a reverse direction of the rotation direction through providing the reed piece 64, whereas at this time, gear of the second transmission gear 632 does not act. The first transmission gear 631 and the second transmission gear 632 are in same size to save the cost.

From the above, numbers of teeth of the gear 6121, the big speed-changing gear 621 and the small speed-changing gear 622 are "10"; and numbers of teeth of the first transmission gear 631 and the second transmission gear 632 are "20".

Referring to FIG. 4 and FIG. 5, the two fixed brackets 7 are disposed and fixed on two upper sides of a window. Each of the two fixed brackets 7 comprises a fixing body 71 mounted on one of the two upper side of the window and a vertical frame 72 connected with the lower side of the fixing body 71, wherein a through via 721 is formed in each of the vertical frames 72. The square fixed column 31 of the winding device 3 or the square first convex shaft 41 of the fixing device 4 penetrates through the through via 721 for positioning.

Figure 9:
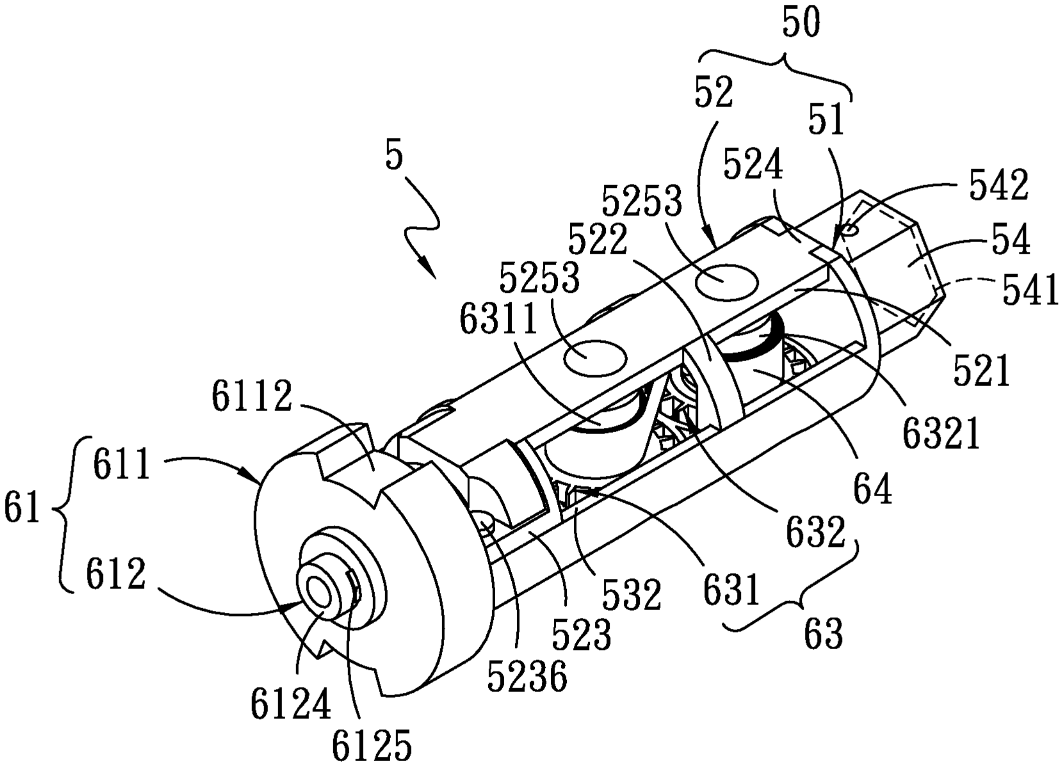
FIG. 9 is a schematic diagram of the power auxiliary device in FIG. 8.
Figure 10:
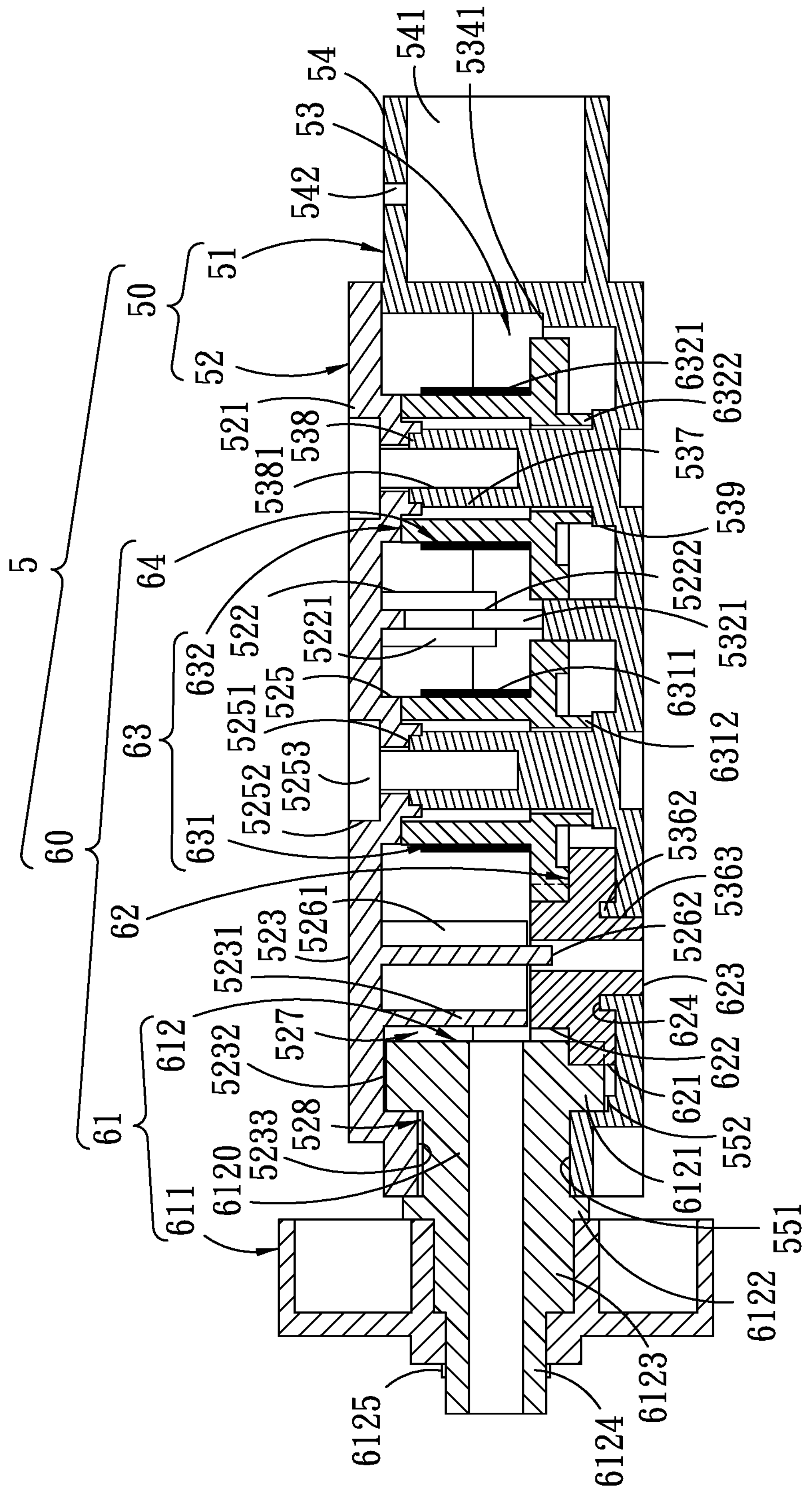
FIG. 10 is a cross-section diagram of the power auxiliary device in FIG. 9.
Figure 11:
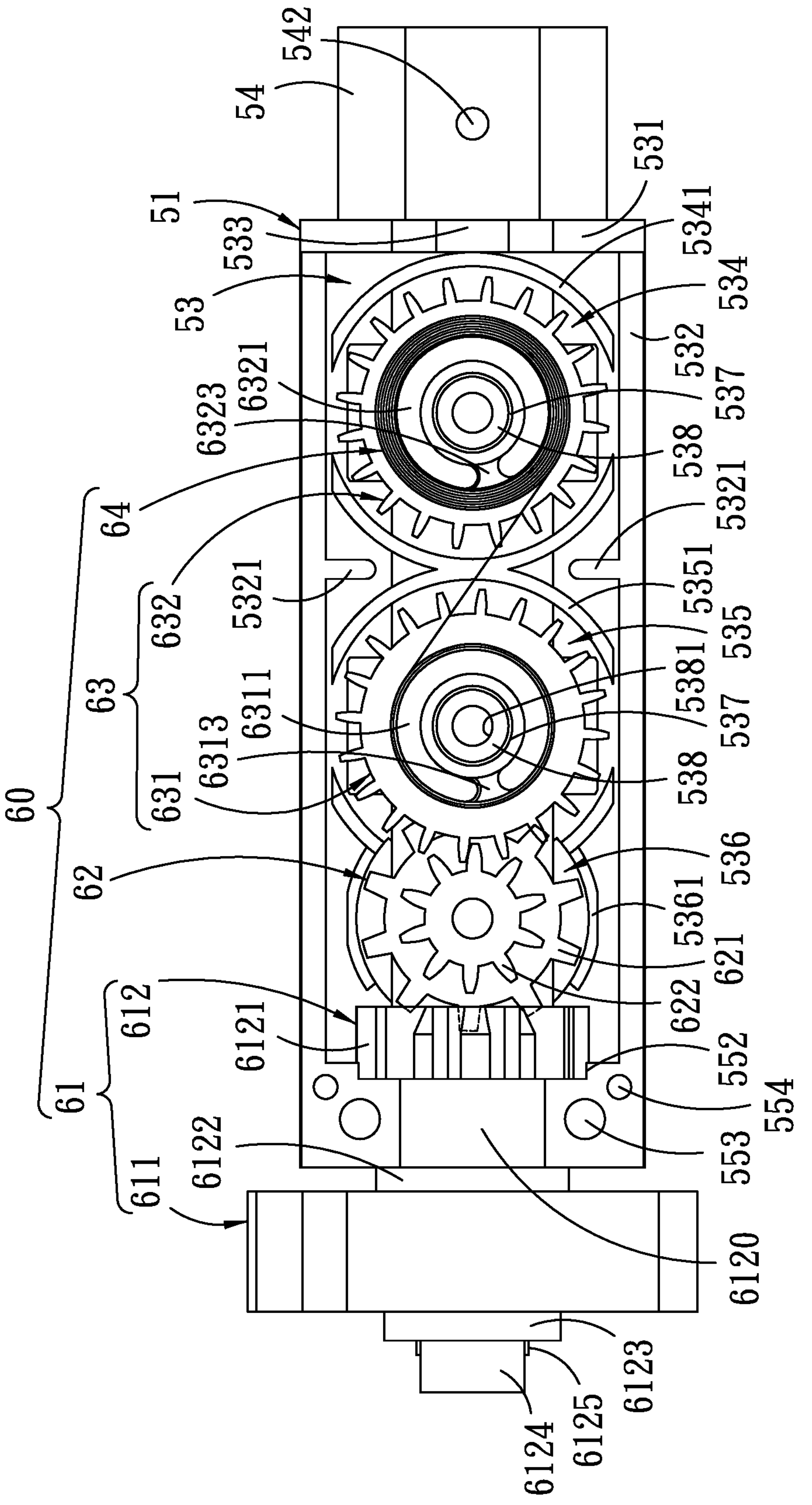
FIG. 11 is a top view of the transmission assembly and a fixed seat in FIG. 8.

Referring to FIG. 4, FIG. 5, FIG. 9 and FIG. 10 again, when the small-sized roller shade 2 is assembled, the curtain sheet 8 is disposed between the upper rail 20 and the lower rail 23. The power auxiliary device 5, the fixing device 4 and the winding device 3 are disposed in the upper rail 20. The winding device 3 and the fixing device 4 are provided under the driving of the upper rail 20. An end of the square fixed column 31 of the winding device 3 is connected with left end of one of the two fixed brackets 7 through a shaft. An end of the square first convex shaft 41 of the fixing device 4 is connected with right end of one of the two fixed brackets 7 through a shaft and extends out of one of the two fixed brackets 7 to assemble the small-sized roller shade 2.

Referring to FIG. 4, FIG. 5, and FIGS. 8, 9, 10, and 11, to spread out the small-sized roller shade 2, a user vertically drops the lower rail 23 downward, the upper rail 20 drives the rotating body 611 to rotate along the limiting convex body 21, the rotating body 611 drives the gear 6121 of the rotating shaft 612 to rotate together, outside diameter of the rotating body 611 is larger than outside diameter of the gear 6121, speeds of the rotating body 611 and the gear 6121 are changed once if the rotating body 611 drives the gear 6121 rotate together by one circle, the gear 6121 rotates and links the big speed-changing gear 621 in a reverse direction of the gear 6121 to rotate, and the big speed-changing gear 621 rotates and drives the small speed-changing gear 622 to rotate in a linking manner. At this time, the big speed-changing gear 621 drives the small speed-changing gear 622 to be changed in speed, the small speed-changing gear 622 rotates and links to the first transmission gear 631 in a reverse direction of the small speed-changing gear 622 to rotate, the small speed-changing gear 622 drives the first transmission gear 631 to rotate. The outside diameter of the first transmission gear 631 is two times than outside diameter of the small speed-changing gear 622, to reduce speed of the first transmission gear 631 and reduce tightening speed of the reed piece 64 sleeved on the outer surfaces of the first sleeve 6311 and the second sleeve 6321. It is effortless to drop the curtain sheet 8 downward to a predetermined position. When the small-sized roller shade 2 is wound, the user lifts the lower rail 23. the restoring elastic force of the reed piece 64 sleeved on outer surfaces of the first sleeve 6311 of the first transmission gear 631 and the second sleeve 6321 of the second transmission gear 632 assists the coil spring 30 of the winding device 3 with insufficient winding force to wound and roll up the curtain sheet 8.

What is claimed is:

1. A power auxiliary device for a small-sized roller shade, comprising:

a fixed assembly, comprising a fixed seat and an upper cover overlying the fixed seat, wherein the fixed seat comprises a holding portion defined by the fixed seat, a connecting convex rod extending from an end of the holding portion, and a connecting concave portion disposed at an other end of the holding portion, and the connecting concave portion communicates with the holding portion; and a transmission assembly, disposed in the holding portion of the fixed assembly and comprising a power portion, a speed-changing portion, a transmission portion and a reed piece, wherein the power portion comprises a rotating shaft disposed on the connecting concave portion, and the rotating shaft comprises a gear disposed at the end of the holding portion, and wherein the speed-changing portion is pivotably coupled to the end of the holding portion about a vertical axis and abuts the gear, and the speed-changing portion comprises a big speed-changing gear engaged with the gear of the rotating shaft and a small speed-changing gear connected to an upper side of the big speed-changing gear, and wherein the transmission portion is pivotably coupled into the holding portion about the vertical axis and abuts the speed-changing portion, and the transmission portion comprises a first transmission gear engaged with the small speed-changing gear and a second transmission gear disengaged with the first transmission gear; two ends of the reed piece are connected with the first transmission gear and the second transmission gear respectively; and an external shape of the reed piece is disposed into an S shape, wherein the holding portion comprises a convex rim connected with one side of the connecting convex rod and two walls connected between the convex rim and the connecting concave portion, and a groove is formed in an upper side of the convex rim, and wherein the holding portion, from the convex rim to the connecting concave portion, comprises a first space, a second space, and a third space communicating with the second space, and the first space is provided with a first frame circle protruding from an inner bottom of the holding portion, connecting with inner sides of the two walls and connecting one side of the convex rim opposite to the connecting convex rod, and the second space is provided with a second frame circle protruding from the inner bottom of the holding portion, connecting with the inner sides of the two walls and connecting the first frame circle, wherein the second frame circle separates the first space from the second space, and the third space is provided with a third frame circle protruding from the inner bottom of the holding portion, connecting with the inner sides of the two walls and connecting the second frame circle, and wherein a reinforcing convex body extends from each of the inner sides of the two walls between the first frame circle and the second frame circle, and the second frame circle communicates with the third frame circle, and wherein two shaft rods respectively extend upward from the first space and the second space and are extended from the inner bottom of the holding portion, and wherein each of the two shaft rods is disposed with a convex connection portion providing a screw hole on an upper side thereof and a first abutting block at a lower side thereof, an outside diameter of the first abutting block is larger than an outside diameter of each of the two shaft rods, and wherein an inside diameter of the first space is equal to an inside diameter of the second space, and the inside diameters of the first space and the second space are larger than an inside diameter of the third space, and wherein a second abutting block extends upward from the third space and extends from the inner bottom of the holding portion, and a through hole is formed in the second abutting block, and wherein the connecting convex rod is in a hexagonal shape, and a hexagonal concave hole is formed in the connecting convex rod, and a fixed hole penetrating through the hexagonal concave hole is formed in an upper side and a lower side of the connecting convex rod, and a first fixing piece penetrates through the fixed hole, and wherein the connecting concave portion is provided with a first concave circle and a second concave circle abutting one side of the first concave circle facing the holding portion, and an inside diameter of the second concave circle is larger than an inside diameter of the first concave circle, and a screwing hole and a pin hole formed beside the screwing hole are formed in the upper side of the connecting concave portion and are formed on each of two sides of the first concave circle.

2. The power auxiliary device for the small-sized roller shade according to claim 1, wherein the upper cover comprises a first pressing plate, two second pressing plates connected to two sides of the first pressing plate and extended outward, and a third pressing plate located on an end of the first pressing plate, and the first pressing plate comprises a convex body, two convex pressing bodies and a pressing rod, wherein the convex body is disposed at another end of the first pressing plate and clamped into the groove of the convex rim, and the two convex pressing bodies are arranged symmetrically relative to a symmetry axis along the two second pressing plates, and the two convex pressing bodies are formed on and extended from a bottom surface of the first pressing plate, and a sunken surface is arranged at bottom of each of the two convex pressing bodies and assembles with the convex connection portion, and two counterbores are formed in an upper surface of the first pressing plate corresponding to the two convex pressing bodies, and two fixing pieces penetrate and fasten the two counterbores and the screw hole of the convex connection portion, and the pressing rod is disposed on the bottom surface and the end of the first pressing plate opposite to the convex body, and the pressing rod comprises a cross cylinder and a convex column extending downward from bottom of the cross cylinder, and the convex column is pivotably coupled to the speed-changing portion, and the cross cylinder abuts an upper side of the small speed-changing gear, and the two second pressing plates respectively from two sides of the first pressing plate are bent downward into arch shapes and are between the two convex pressing bodies, the two second pressing plates overlie the two walls, and each of the two second pressing plates comprises an abutting convex and a clamping groove, each abutting convex is arranged on a bottom of each of the two second pressing plates and protrudes inward, each clamping groove is recessed in each abutting convex, and each abutting convex abuts each inner side of the two walls, and the two reinforcing convex bodies are placed and fixed into each clamping groove, and the third pressing plate overlies the connecting concave portion and comprises a convex plate, a third concave circle and a fourth concave circle, and the convex plate connects to one end of the cross cylinder, the third concave circle is beside to one side of the convex plate opposite to the cross cylinder, the fourth concave circle is beside the third concave circle, and the third concave circle assembles with the second concave circle of the connecting concave portion and form a first circular space, and the fourth concave circle assembles with the first concave circle of the connecting concave portion and form a second circular space, and the third pressing plate is provided with two holes and two convex pins, the two holes correspond to the screwing holes of the connecting concave portion, and each of the two convex pins are embedded in the pin hole of the connecting concave portion, and two second fixing pieces penetrate through the two holes and fasten to the screwing hole.

3. The power auxiliary device for the small-sized roller shade according to claim 1, wherein the speed-changing portion is pivotably coupled to the third space of the holding portion about the vertical axis and further comprises an embedding rod and an embedding groove, and the embedding rod is connected with a lower side of the big speed-changing gear and is embedded into the through hole of the second abutting block, and the embedding groove is formed between the embedding rod and the big speed-changing gear, and the embedding groove receives the second abutting block.

4. The power auxiliary device for the small-sized roller shade according to claim 1, wherein the transmission portion is pivotably coupled to the second space and the third space of the holding portion about the vertical axis, and a first sleeve and a second sleeve are respectively disposed on the first transmission gear and the second transmission gear, and the first sleeve and the second sleeve are pivotably coupled to the two shaft rods, and a first bottom rod and a second bottom rod are respectively disposed under the first transmission gear and the second transmission gear, and the first bottom rod and the second bottom rod abut the first abutting block, and a first clamping groove is formed in the first sleeve, and a second clamping groove is formed in the second sleeve, wherein the two ends of the reed piece are respectively connected with the first clamping groove of the first sleeve and the second clamping groove of the second transmission gear and sleeved on outer surfaces of the first sleeve and the second sleeve.

5. The power auxiliary device for the small-sized roller shade according to claim 2, wherein the power portion further comprises a rotating body, and the rotating body comprises a shaft hole and at least one limiting groove, and the shaft hole is a hexagonal hole, wherein the rotating shaft further comprises a round rod connected with one end of the gear and disposed in the second circular space, a convex blocking sheet connected with the round rod and protruding in an opposite direction of the gear, a convex shaft connected with the convex blocking sheet and protruding in an opposite direction of the round rod, and a clamping shaft connected with the convex shaft and protruding in an opposite direction of the convex blocking sheet, wherein the convex blocking sheet abuts the connecting concave portion, and the convex blocking sheet is provided between the third pressing plate and the rotating body, and the convex shaft is disposed into a hexagonal shape corresponding to the shaft hole of the rotating body, and the convex shaft is positioned in the shaft hole of the rotating body, the rotating body rotates and drives the rotating shaft, and the clamping shaft is provided with a convex flange which abuts and positions the shaft hole from outside thereof.

6. The power auxiliary device for the small-sized roller shade according to claim 1, wherein an outside diameter and a number of teeth of the gear are equal to an outside diameter and a number of teeth of the big speed-changing gear, and the outside diameter of the big speed-changing gear is two times longer than an outside diameter of the small speed-changing gear, and a number of teeth of the small speed-changing gear is equal to the number of teeth of the big speed-changing gear, and an outside diameter and a number of teeth of the first transmission gear is equal an outside diameter and a number of teeth of the second transmission gear, and the outside diameters and the numbers of teeth of the first transmission gear and the second transmission gear are two times larger than the outside diameter and the number of teeth of the small speed-changing gear.

7. The power auxiliary device for the small-sized roller shade according to claim 6, wherein the numbers of teeth of the gear, the big speed-changing gear, and the small speed-changing gear are 10, and numbers of teeth of the first transmission gear and the second transmission gear are 20.

* * * * *